United States Patent [19]

Rosa et al.

[11] 4,012,919
[45] Mar. 22, 1977

[54] METHOD FOR RAPIDLY LAYING A PIPELINE IN DEEP WATER BY AN ANCHORED LAYING MEANS, AND THE RELATIVE DEVICES

[75] Inventors: Giovanni Rosa, San Donato Milanese; Claudio Morelli, Bologna; Pasquale Brando, San Donato Milanese; Giuseppe Daghetti, Segrate (Milan), all of Italy

[73] Assignee: Saipem S.p.A., Milan, Italy

[22] Filed: Sept. 29, 1975

[21] Appl. No.: 617,734

[52] U.S. Cl. ................................................. 61/108
[51] Int. Cl.² .......................................... F16L 1/00
[58] Field of Search .......................... 61/72.3, 72.1

[56] References Cited

UNITED STATES PATENTS

| | | | |
|---|---|---|---|
| 3,566,609 | 3/1971 | Smith | 61/72.3 |
| 3,715,890 | 2/1973 | Langner et al. | 61/72.3 |
| 3,796,058 | 3/1974 | Jones et al. | 61/72.3 |

Primary Examiner—Jacob Shapiro
Attorney, Agent, or Firm—Ralph M. Watson

[57] ABSTRACT

This invention relates to an improved method for rapidly laying a pipeline in deep water by an anchored floating means. The rapid laying is obtained by varying the forces exerted by winches mounted on the floating means in such a manner as to impart a rapid movement to the floating means, in the longitudinal direction of laying, for a distance equal to the length of the piece of pipe added to the free end of the pipeline to be laid. Before termination of the rapid movement there is applied to the floating means a compensating force, whose direction, sense and intensity are such that, together with the forces exerted by the winches, said compensating force opposes moment by moment the central elastic force which induces a damped oscillatory motion in the floating means. This oscillation is thus eliminated or drastically and rapidly dampened.

2 Claims, 2 Drawing Figures

METHOD FOR RAPIDLY LAYING A PIPELINE IN DEEP WATER BY AN ANCHORED LAYING MEANS, AND THE RELATIVE DEVICES

This invention relates to an improved method and the relative devices for rapidly laying a pipeline by an anchored laying means, which by considerably reducing the oscillations induced in the laying means by the pipeline laying operation makes it possible to carry out this operation in very deep water.

In a pipeline laying operation, the means used for laying are notably moved successively in a longitudinal direction by a distance equal to the length of the additional piece of pipe welded to the pipeline to be laid, so that the pipeline becomes immersed by an equal length.

This movement of the anchored craft is made by operating the forward and aft winches in such a manner that as the forward cables wind on the drums of the bow winches, the initial catenary configuration of the cables is modified into a tighter curve, so causing the pull of the cables on the means used for the laying to increase, while the simultaneous unwinding of the aft cables from the stern winch drums causes the former to assume a slacker curve, so reducing their pull on the means, and the difference in the pulls exerted by the forward and aft cables on the laying means, the pull exerted by the pipeline to be laid remaining constant, generates the force which induces the required longitudinal movement of the laying means to enable the laying operation to be carried out.

When the necessary movement has been made, the laying means should immediately stop in the new static equilibrium position in which the resultant pull exerted by the bow cables is compensated by the sum of the resultant pull exerted by the stern cables plus the pull exerted by the pipeline on the laying means, but in fact as the movement has to be made in the shortest time possible, and thus rapidly, the inertia of the laying means and the possibility of the resultant pull exerted by the bow cables being greater than the sum of the other pulls means that the laying means passes beyond the static equilibrium position, because of which it is subjected to a central elastic return force due to the difference between the actual greater resultant value of the pulls exerted by the stern cables plus the pull exerted by the pipeline, and the resultant value of the pulls exerted by the bow cables. This central elastic force, which is gradually damped by the resistant forces created by the water, air etc., is evidently proportional to the distance of the point of maximum movement reached by the laying means from the position of static equilibrium, ie from the position of the laying means when the relative sliding between the pipeline and laying means has terminated, ie at the moment in which the length of the laid pipeline has increased by a distance equal to the length of the piece of pipe added by welding, and is therefore greater the greater the depth of the sea in which the laying means is anchored. As a result, the anchored laying means is subjected to damped oscillatory motion about its position of static equilibrium, the amplitude of which is proportional to the depth of the water in which the laying means operates.

From the aforegoing, it is evident that whereas during laying operations in shallow water the oscillatory motion induced in the anchored craft does not cause any practical inconvenience because of its small amplitude, it becomes a phenomenon of considerable importance in the case of laying operations in deep water.

On the other hand, the laying and/or recovery of pipelines tends at present to take place in sea of ever increasing depth, which makes it necessary to provide means for eliminating or at least minimising the oscillatory motion which is a great obstacle to laying operations in deep water. In this respect, the large amplitude of the induced oscillation, besides giving the long portion of pipeline which extends from the laying means to the bottom of the sea a configuration such as to facilitate the occurrence of pipeline bending and flattening phenomena, also prevents the correct welding of the pipes to the pipeline to be laid.

The object of the present invention is to eliminate the aforementioned disadvantages by providing an improved method by which the means used for laying a pipeline in deep water is held with minimum oscillation in the static equilibrium position attained on termination of the longitudinal movement, which is carried out in the shortest possible time by varying the pulls exerted by the bow and stern winches of the means for laying a length of pipeline equal to the added pipe length.

In the method according to the present invention, a compensating force is applied to the anchored laying means before termination of said movement, the direction, sense and intensity of the force being such that together with the forces exerted by the winches it opposes moment by moment the central elastic force which induces the damped oscillatory motion in the anchored laying means, so as to eliminate or drastically and rapidly dampen the amplitude of the oscillation produced.

According to a further characteristic of the invention, this compensating force is generated by azimuth propulsors the thrust of which can be varied by varying the position of their blades or varying their speed, and which are mounted on the lower submerged part of the anchored laying means, the direction, sense and intensity of the propulsor thrusts being determined and regulated moment by moment, by an electronic computer installed in the laying means.

According to a further characteristic of the invention, measuring instruments are used which measure the position of the laying means, the direction of the bow, the angles and levels assumed in the various positions by the launching ramp or stinger and the pipeline to be laid, the tensions in the anchoring cables and the angle of connection of each cable to the laying means, the instantaneous speed and acceleration of the laying means during the movement, the intensity, direction and sense of the external forces and underwater currents, the number and indication of the engines in movement for each propulsor and their speed, the thrust in direction, intensity and sense of the azimuth propulsors and the forces generated by the winches, the values measured by these instruments being fed, in the method according to the invention, to said electronic computer which processes them in such a manner that the thrusts of the azimuth propulsors in direction, sense and intensity, and the forces exerted by the winches on the cables, are varied moment by moment in accordance with predetermined adjustment criteria in phase opposition with the longitudinal component of the resultant of the forces which induce the oscillatory motion in the laying means or, in a modification of the method according to the invention, in phase opposition with said resultant when it is required to also oppose the transverse thrusts generated, for example, by the external forces and underwater currents.

The invention will be more evident by reference to the accompanying drawings which illustrate a preferred embodiment given by way of non-limiting example, in that technical or constructional modifications may be made without leaving the scope of the inventive idea.

Figure 1:
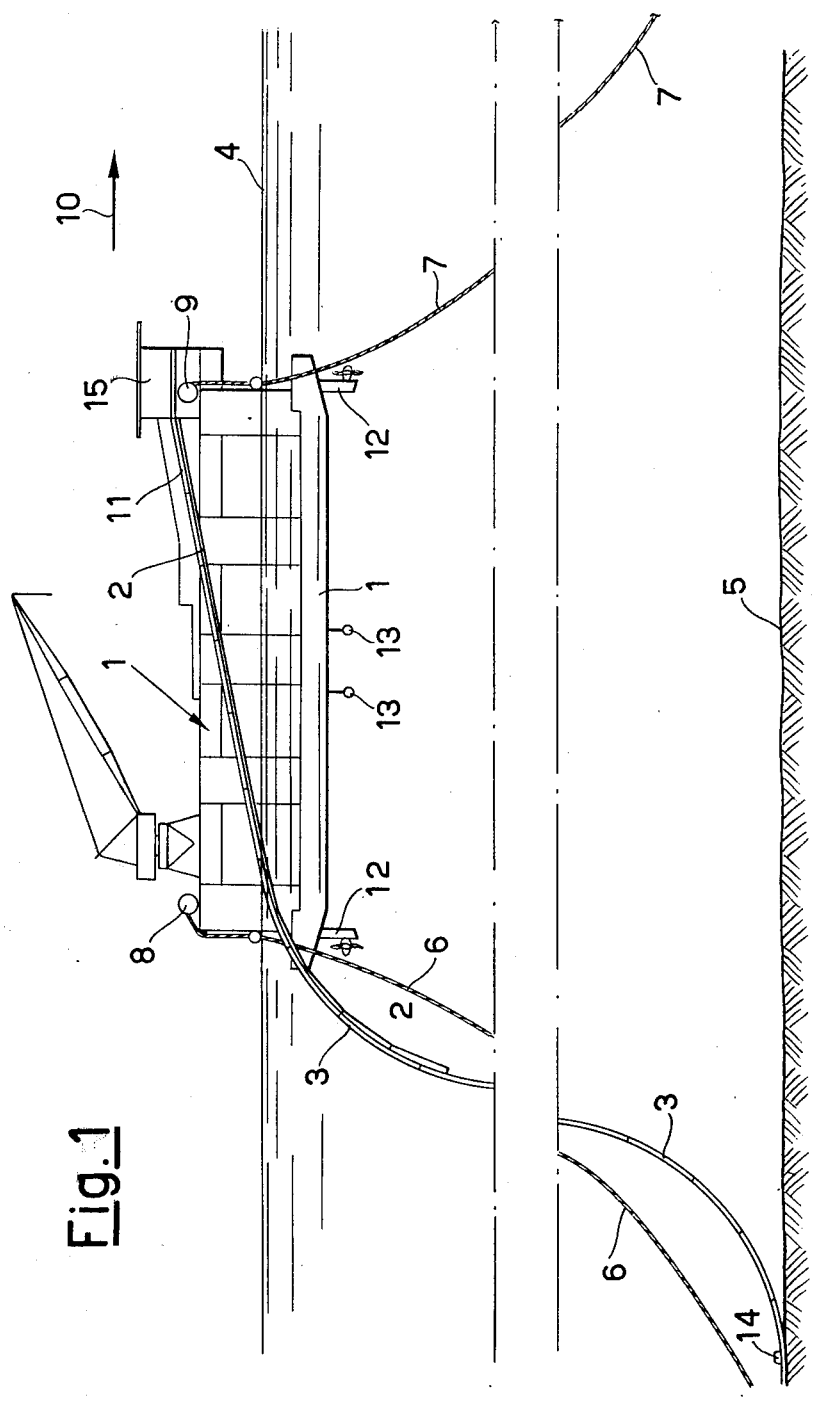
FIG. 1 is a diagrammatic side view of the laying means, provided with winches, cables, measuring instruments and azimuth propulsors used in the method according to the present invention.

In FIG. 1, the floating means used for laying is indicated by the reference numeral 1, and in the specific case shown consists of a catamaran provided with a launching ramp 2 for supporting the pipeline 3 to be laid, such as that described in the previous Italian patent application No. 26817 A/73 filed on 20.7.73 and the corresponding U.S. Pat. No. 3,967,461. The catamaran 1, floating on the sea 4, is anchored to the bed 5 by a system of cables or chains 6 and 7 (the figure shows only two cables), which are kept on the bottom by a system of anchors or other fixing systems, and are wound on the catamaran deck on drums of stern winches 8 and bow winches 9, and by operating these latter the catamaran may be moved longitudinally in the laying direction indicated by the arrow 10, by a distance equal to the length of the piece of pipe 11 subsequently welded to the pipeline 3, in order to carry out the laying operation.

The said catamaran movement has to take place in the shortest possible time, and as already stated, when the laying operation takes place in deep water this induces undesirable large-amplitude oscillatory motion in the catamaran, which would obstruct laying, and therefore in the method according to the present invention, the catamaran is provided with variable thrust azimuth propulsors 12 mounted on the catamaran bottom, with hydrophones 13 also mounted on the bottom of the catamaran and disposed along two orthogonal directions to receive the signals emitted by an ultrasonic emitter 14 situated on the pipeline laid on the sea bed, in order to determine the position of the catamaran, with a gyroscopic compass to determine the direction of the catamaran bow, with instruments to measure the instantaneous speed and acceleration of the catamaran during its movement when laying the pipeline, the underwater currents, the external forces acting on the catamaran (winds, gusts of wind, wave motion and surface water currents), the pulls exerted by the cables 6 and 7 and the angle of connection of these cables to the catamaran, the position assumed by the launching ramp or stinger and by the pipeline, the tension between the pipeline and catamaran, the state of the engines, the position of the blades and the direction and intensity of the thrusts exerted by the winches 8 and 9, and finally with an electronic computer installed in the control cabin 15.

All the data supplied by these measuring instruments is fed to the electronic computer, which processes it in such a manner as to vary moment by moment the thrusts and directions of the azimuth propulsors and the forces exerted by the winches in phase opposition with the central elastic force which generates the said undesirable oscillatory motion, in order to eliminate or considerably and rapidly dampen the amplitude of the oscillation produced.

Figure 2:
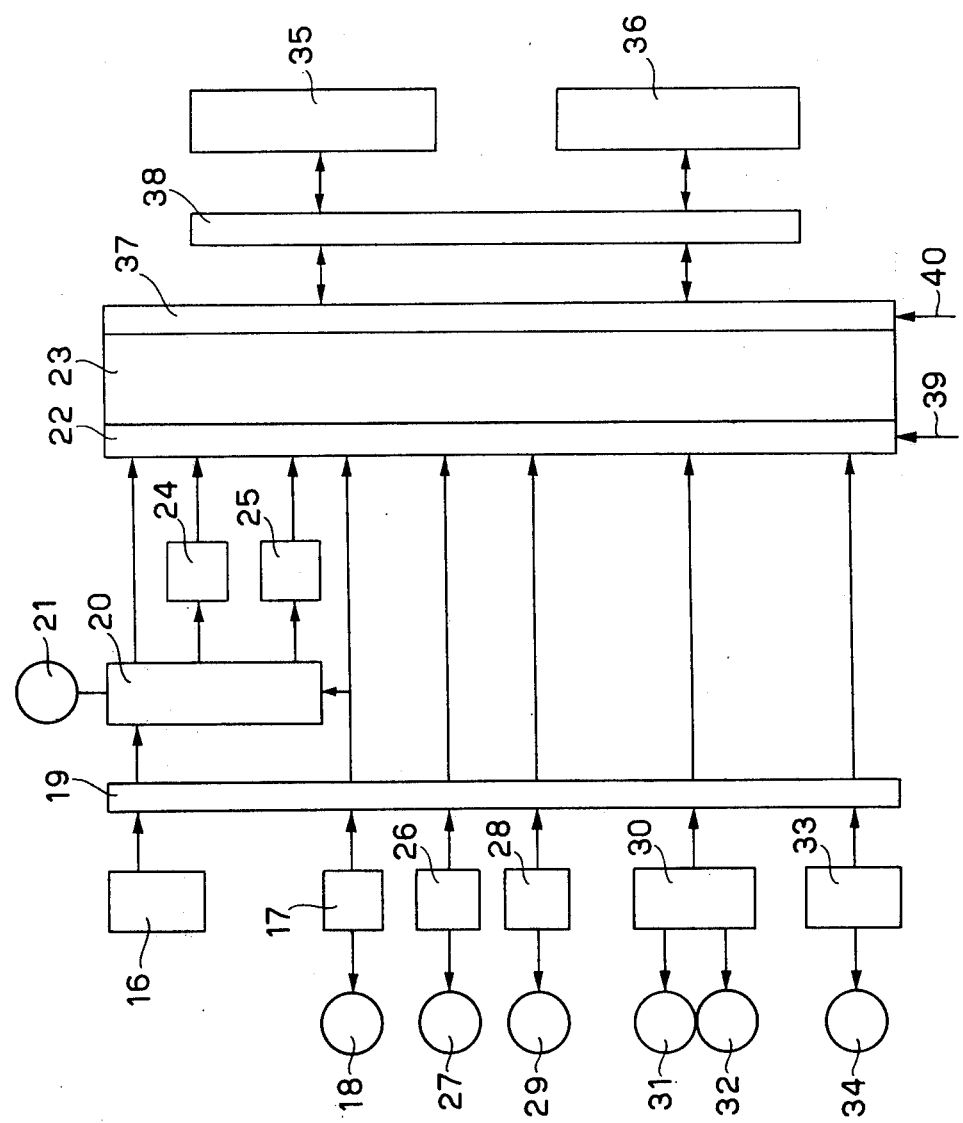
FIG. 2 is a block diagram of the data processing for adjusting the direction and intensity of the forces exerted by the azimuth propulsors and winches for eliminating or reducing the oscillatory phenomenon which takes place during the laying of a length of pipeline equal to the length of welded pipe.

FIG. 2 shows by way of example a block diagram of the processing by the electronic computer of the data supplied by the various measuring instruments for determining moment by moment the direction, sense and intensity of the thrust to be exerted by the azimuth propulsors and the forces to be exerted by the winches in order to eliminate or dampen the oscillatory phenomenon which arises during movement of the anchored laying means in laying a portion of pipeline equal to the length of the piece of pipe welded to the pipeline. In the block diagram, the reference numeral 16 indicates the system consisting of the ultrasonic emitter 14 and hydrophones 13, and 17 indicates a gyroscopic compass which gives the direction of the catamaran, shown on a screen 18. The signals emitted by these instruments are fed through a signal converter 19 to a calculating unit 20 which processes them and emits a signal which indicates the position of the catamaran. This signal, also shown on the screen 21, is fed through the signal converter 22 to the computer 23 and to the inlet of the units 24 and 25 respectively, which provide output signals proportional to the instantaneous speed and acceleration respectively of the catamaran during its movement for the laying of the pipeline, these signals also being fed to the computer 23 through the converter 22, as is the signal emitted by the gyroscopic compass 17. The reference number 26 indicates a measuring instrument for the underwater currents, the signal from which, shown on the screen 27, is fed to the computer 23 through the converters 19 and 22, and in the same manner the computer 23 also receives the values of the pulls developed by the cables and the angles formed by these cables at their connection to the catamaran, and which are measured by the instruments 28 and shown on the screens 29. The values of the external forces measured by the instrument 30 and fed to the computer 23 relate to the direction, sense and speed of the winds which are also shown on the screen 31, the direction, sense and speed of the gusts of wind shown on the screen 32, the horizontal component of the wave motion and the intensity, direction and sense of the surface water currents. The computer 23 also receives the signals indicating the position of the loading ramp or stinger and the pipeline being laid, and the tension between the pipeline and catamaran measured by the instruments 33 and shown on the screens 34.

The reference numerals 35 and 36 indicate the azimuth propulsor assembly 12 and the winch assembly 8 and 9 respectively, from which the state of the engines (number, speed etc.), the position of the blades or rotational speed and the direction of thrust of each propulsor, and the forces exerted by the winches respectively are fed to the computer 23 through the converters 37 and 38.

All the data fed to the computer 23 is programmed by it in accordance with a programme fed at 39, and the computer automatically feeds signals indicating the result of this processing to the units 35 and 36 through the converters 37 and 38, these signals suitably adjusting moment by moment the value, direction and sense of the thrust exerted by the propulsors and the value of the forces exerted by the winches respectively, in such a manner that their combined action eliminates or considerably dampens the oscillatory motion induced in the catamaran. The computer 23 is also provided with a control 40 for manually varying the propulsor thrusts and the winch forces.

What we claim is:

1. The method of rapidly laying a pipeline in a deep body of water by floating laying means having a bow and a stern and provided with a launching ramp, winches mounted on the bow and stern, respectively, of the laying means, cables extending from the laying means to anchors at the bottom of the body of water and adapted to hold the laying means in a selected position and windable on their associated winches to rapidly move the laying means longitudinally to a new position in the laying direction for a distance equal to the length of a piece of pipe to be added to the pipeline, and variable blade-variable speed azimuth propulsors mounted on the bottom of the laying means, wherein the improvement comprises, counteracting the central elastic force which induces an oscillatory motion in the floating laying means when it is moved to a new position by automatically measuring the forces to which the laying means is subjected as it is moved to that new position, and feeding the values so obtained to a computer programmed to regulate the forces exerted by the respective winches on their associated cables and the thrust exerted by the azimuth propulsors so as to rapidly dampen the amplitude of said oscillatory motion.

2. The method of rapidly laying a pipeline as claimed in claim 1, wherein the position of the laying means, the direction of the bow, the angles and levels assumed in the various positions by the launching ramp and the pipeline to be laid, the tensions in the anchoring cables and the angle of connection of each cable to the laying means, the instantaneous speed and acceleration of the laying means during said rapid movement, the intensity, direction and sense of the external forces and underwater currents, the movement and speed, the thrust in direction, intensity and sense of the azimuth propulsors and the forces exerted by the winches, are measured by automatic measuring instruments and the values obtained thereby are fed to said electronic computer which processes them in such a manner that the thrusts of the azimuth propulsors in direction, sense and intensity, and the forces exerted by the winches on the cables, are varied moment by moment in accordance with predetermined adjustment criteria in phase opposition with the longitudinal component of the resultant of the forces which induce the oscillatory motion in the laying means.

* * * * *

UNITED STATES PATENT AND TRADEMARK OFFICE
CERTIFICATE OF CORRECTION

PATENT NO. : 4,012,919
DATED : March 22, 1977
INVENTOR(S) : Giovanni Rosa, Claudio Morelli and Pasquale Brando It is certified that error appears in the above-identified patent and that said Letters Patent are hereby corrected as shown below:

First page after line "[21]" insert the following lines:

--[30]   Foreign Application Priority Data

September 27, 1974   Italy........27795/74--.

Column 4, line 33, Before "26" correct "number" to read

--numeral--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*